United States Patent
Cheng et al.

(10) Patent No.: US 8,344,701 B2
(45) Date of Patent: Jan. 1, 2013

(54) ELECTRONIC APPARATUS WITH FAKE CHARGING PREVENTING FUNCTION AND METHOD THEREOF

(75) Inventors: Hua-Dong Cheng, Shenzhen (CN); Han-Che Wang, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 525 days.

(21) Appl. No.: 12/606,102

(22) Filed: Oct. 26, 2009

(65) Prior Publication Data

US 2011/0074363 A1 Mar. 31, 2011

(30) Foreign Application Priority Data

Sep. 29, 2009 (CN) .......................... 2009 1 0307975

(51) Int. Cl.
 *H02J 7/00* (2006.01)
 *H02H 3/00* (2006.01)
(52) U.S. Cl. ........ 320/162; 320/134; 320/135; 320/152; 320/157; 361/1; 361/13; 361/42
(58) Field of Classification Search .................. 320/162
 See application file for complete search history.

(56) References Cited

U.S. PATENT DOCUMENTS

| | | | | |
|---|---|---|---|---|
| 5,680,286 A | * | 10/1997 | Pacholok | 361/42 |
| 5,808,446 A | * | 9/1998 | Eguchi | 320/134 |
| 2007/0145944 A1 | * | 6/2007 | Poff | 320/112 |
| 2007/0183103 A1 | * | 8/2007 | Sung | 361/42 |

* cited by examiner

*Primary Examiner* — Yalkew Fantu
(74) *Attorney, Agent, or Firm* — Altis Law Group, Inc.

(57) ABSTRACT

A method for preventing fake charging of an electronic apparatus is provided. The method includes: providing a power management table for setting function units for each power range; activating a fake charging preventing function according to a predetermined condition or an activating operation of users; detecting power of the electronic apparatus every a first predetermined time interval; determining a current power range the detected power falls into; determining whether the current power range is changed; beginning to time when the current power range is changed; activating function units which are disabled and whose power range is the current power range when the timing reaches a second predetermined time interval and the detected power is still in the current power range.

10 Claims, 2 Drawing Sheets

ELECTRONIC APPARATUS WITH FAKE CHARGING PREVENTING FUNCTION AND METHOD THEREOF

BACKGROUND

1. Technical Field

The present disclosure relates to an electronic apparatus with a fake charging preventing function and a method thereof.

2. Description of Related Art

When being charged, electronic apparatus often generates fake charging. When the electronic apparatus with fake charging works, the power of the electronic apparatus is consumed quickly, thus affecting proper functioning of the apparatus.

BRIEF DESCRIPTION OF THE DRAWINGS

The components of the drawings are not necessarily drawn to scale, the emphasis instead being placed upon clearly illustrating the principles of the electronic apparatus with a fake charging preventing function. Moreover, in the drawings, like reference numerals designate corresponding parts throughout several views.

DETAILED DESCRIPTION

Figure 1:
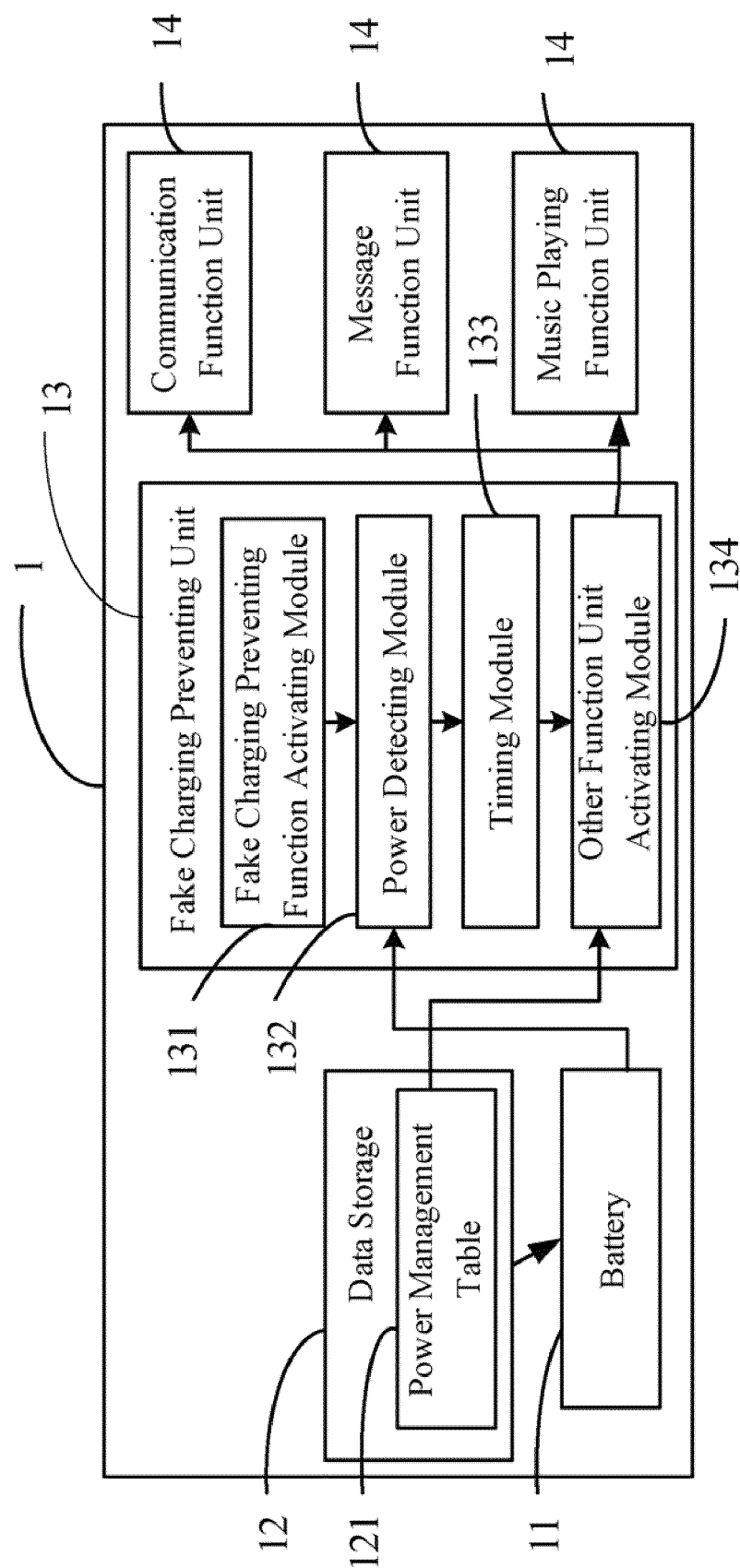
FIG. 1 is a block diagram of an electronic apparatus with a fake charging preventing function in accordance with an exemplary embodiment.

FIG. 1 is a block diagram of an electronic apparatus with a fake charging preventing function (hereinafter "the electronic apparatus") in accordance with an exemplary embodiment. The electronic apparatus 1 includes a battery 11, a data storage 12, a fake charging preventing unit 13, and other function units 14, such as communication function unit, message function unit, and music playing function unit, and the like.

The battery 11 is for providing power for all function units of the electronic apparatus 1. A power management table 121, stored in the data storage 12, is for setting power ranges for function units. In this exemplary embodiment, the electronic apparatus 1 is provided at least one power range, and the power range is designated for least one function unit, which can work normally in the power range. An example of the power management table 121 is shown in the following table.

| Power Management Table | |
|---|---|
| Power range | Function unit |
| Power range A | Phonebook Function |
| Power range B | Communication Function, Phonebook Function |
| Power range C | Communication Function, Phonebook Function, Message Sending Function, Music playing function |
| Power range D | All functions |

The fake charging preventing unit 13 includes a fake charging preventing function activating module 131, a power detecting module 132, a timing module 133, and other function unit activating module 134. The fake charging preventing function activating module 131 is for activating the fake charging preventing function according to a predetermined condition or an activating operation of users. The predetermined condition can be that the electronic apparatus 1 is charging or at least one function unit of the electronic apparatus 1 is disabled.

The power detecting module 132 is for detecting the power of the battery 11 every a first predetermined time interval, and determining a current power range that the detected power falls into. When the current power range that the detected power falls into is determined, the power detecting module 132 compares the current power range with a previous power range to determine whether the current power range is changed. The previous power range is the power range that the power which the power detecting module 132 detected previously falls into. If the determined power range is changed, the timing module 133 begins to time. When the time the timing module 133 records reaches a second predetermined time interval and the detected power is still in the current power range, the other function unit activating module 134 activates function units which have been disabled and whose power range recorded in the power management table 121 is equal to the current power range.

Figure 2:
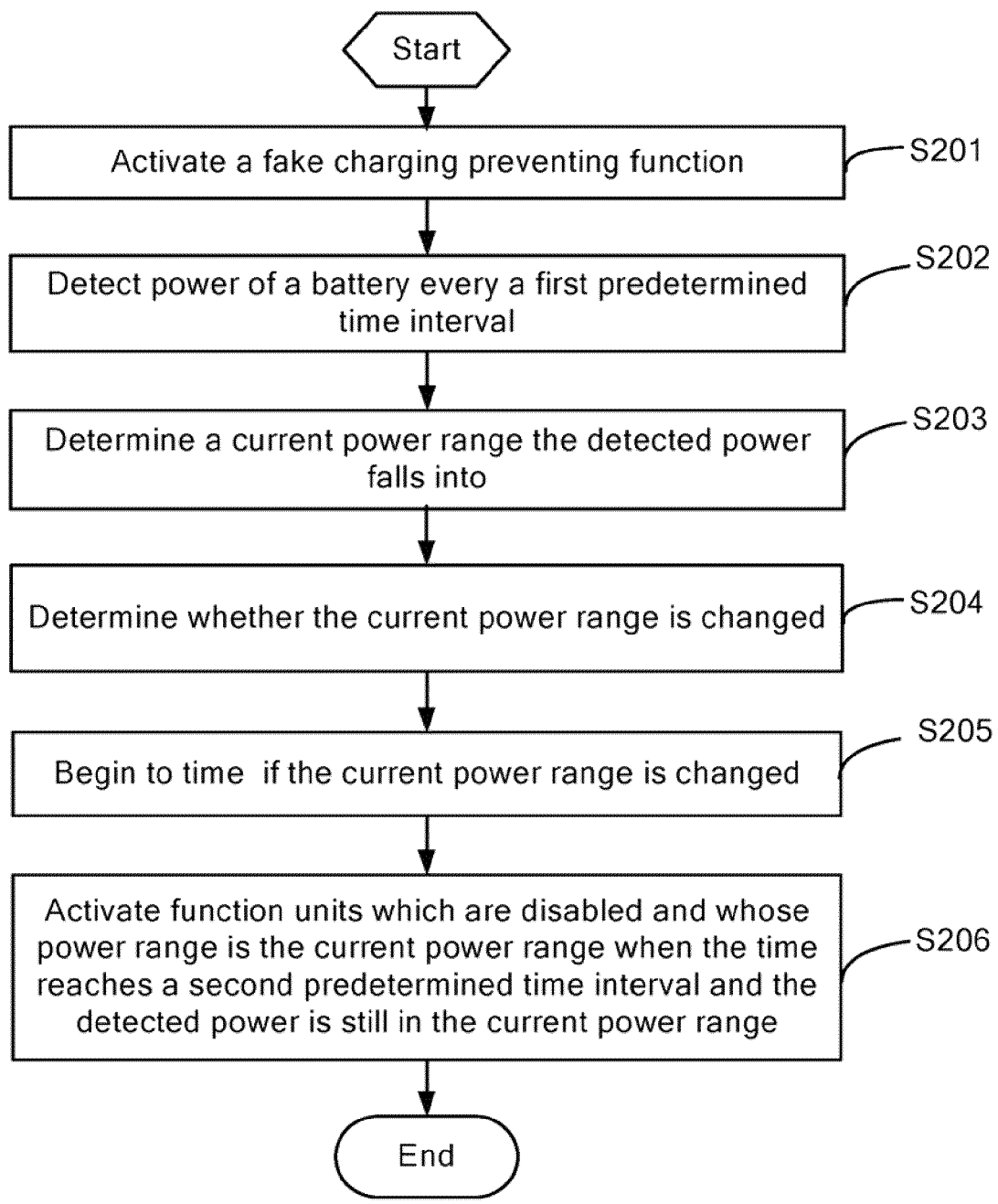
FIG. 2 is a flowchart of a method for preventing fake charging of the electronic apparatus of FIG. 1 in accordance with an exemplary embodiment.

FIG. 2 is a flowchart of a method for preventing fake charging of the electronic apparatus 1 of FIG. 1 in accordance with an exemplary embodiment.

In step S201, the fake charging preventing function activating module 131 activates the fake charging preventing function according to the predetermined condition or the activating operation of users.

In step S202, the power detecting module 132 detects the power of the battery 11 every the first predetermined time interval.

In step S203, the power detecting module 132 determines a current power range the detected power falls into.

In step S204, when the current power range that the detected power falls into is determined, the power detecting module 132 determine whether the current power range is changed.

In step S205, if the current power range is changed, the timing module 133 begins to time.

In step S206, when the time the timing module records reaches a second predetermined time interval and the detected power is still in the current power range, the other function unit activating module 134 activates function units which have been disabled and whose power range recorded in the power management table 121 is equal to the current power range.

Although the present disclosure has been specifically described on the basis of preferred embodiments, the disclosure is not to be construed as being limited thereto. Various changes or modifications may be made to the embodiment without departing from the scope and spirit of the disclosure.

What is claimed is:

1. An electronic apparatus with a fake charging preventing function, comprising a battery, data storage, a fake charging preventing unit, and a plurality of other function units, a power management table being stored in the data storage for setting power ranges for function units, the fake charging preventing unit comprising:

a fake charging preventing function activating module for activating the fake charging preventing function according to a predetermined condition or an activating operation of users;

a power detecting module for detecting power of the battery every first predetermined time interval, determining a current power range of the detected power; and determining whether the current power range changed;

a timing module for beginning to time when the current power range changed; and a function unit activating module which have been disabled and whose power range recorded in the power management table is equal to the current power range when the time recorded by the timing module records reaches a second predetermined time interval and the detected power is still in the current power range.

2. The electronic apparatus as described in claim 1, wherein the predetermined condition is that the electronic apparatus is being charged.

3. The electronic apparatus as described in claim 1, wherein the predetermined condition is that at least one function unit of the electronic apparatus is disabled.

4. The electronic apparatus as described in claim 1, wherein the electronic apparatus is provided at least one power range, and the power range is designated for at least one function unit which can work normally in the power range.

5. The electronic apparatus as described in claim 1, wherein the power detecting module compares the current power range with a previous power range to determine whether the current power range is changed, the previous power range is the power range that the power which the power detecting module detects previously falls into.

6. A method for preventing fake charging of an electronic apparatus, comprising:
providing a power management table for setting power ranges for function units;
activating a fake charging preventing function according to a predetermined condition or an activating operation of users;
detecting power of the electronic apparatus every first predetermined time interval;
determining a current power range of the detected power falls into;
determining whether the current power range changed;
beginning to time when the current power range changed;
activating function units which are disabled and whose power range is the current power range when the timing reaches a second predetermined time interval and the detected power is still in the current power range.

7. The method as described in claim 6, wherein the predetermined condition is that the electronic apparatus is being charged.

8. The method as described in claim 6, wherein the predetermined condition is that at least one function unit of the electronic apparatus is disabled.

9. The method as described in claim 6, wherein the electronic apparatus is provided with at least one power range, and the power range is designated for at least one function unit, which can work normally in the power range.

10. The method as described in claim 6, wherein determining whether the current power range is changed by comparing the current power range with a previous power range, the previous power range is the power range which the power is detected previously falls into.

* * * * *